United States Patent [19]

Lycke

[11] Patent Number: 4,662,503
[45] Date of Patent: May 5, 1987

[54] DOCKING AND LOCKING DEVICE FOR A PALLET IN A ROBOT OR LIKE SYSTEM

[75] Inventor: Anders H. Lycke, Bromma, Sweden

[73] Assignee: International Business Machines Corporation, Armonk, N.Y.

[21] Appl. No.: 641,621

[22] Filed: Aug. 17, 1984

[30] Foreign Application Priority Data

Aug. 19, 1983 [SE] Sweden .................................. 83004

[51] Int. Cl.$^4$ ............................................ B65G 49/00
[52] U.S. Cl. .................................................... 198/345
[58] Field of Search ............ 198/472, 345, 648, 340, 198/355, 349, 465.1, 465.2, 346.1

[56] References Cited

U.S. PATENT DOCUMENTS

| 3,126,837 | 3/1967 | Noye et al. | 198/349 X |
| 3,658,315 | 4/1972 | Boucherie | 198/694 X |
| 3,931,882 | 1/1976 | Ossbahr | 198/648 |
| 4,394,897 | 7/1983 | Brems | 198/345 |
| 4,520,919 | 1/1985 | Keitaro | 198/648 |

FOREIGN PATENT DOCUMENTS 2085332 4/1982 United Kingdom .

Primary Examiner—Joseph E. Valenza
Assistant Examiner—D. Glenn Dayoan

[57] ABSTRACT

A docking and locking system for a pallet in a robot system using pallets which are moved into an approximate work position within the work envelope of the robot. A linear motor is fixedly mounted to the robot frame and positions an elongated bar which carries a stud which is moved upwards into a socket by the bar motion. The socket is an integral part of a stud bolt which is adjustably mounted to the extruded section of a pallet. During the upwards movement of the stud, the chamfered section of the stud first interacts with the lower inner edge of the socket and then with the tapered section of the socket, so that the pallet is positioned in a horizontal, exactly defined position. Upon further movement the stud lifts the pallet and presses its extruded section against the guide rail, which is fixedly mounted to the frame, so that the pallet is positioned in a vertical, exactly defined position and simultaneously further docking apparatus, such as electric connectors and hydraulic and/or pneumatic couplings, located on the bar cooperate with corresponding docking apparatus on the pallet.

6 Claims, 6 Drawing Figures

DOCKING AND LOCKING DEVICE FOR A PALLET IN A ROBOT OR LIKE SYSTEM

BACKGROUND OF THE INVENTION

The invention relates to a docking and locking system for a pallet in a robot or like system.

Modern assembly robots or like systems are able to operate without human interaction for relatively long time periods. Reference is made to IBM Robot System marketed by IBM as the IBM 7565 manufacturing system which is well known to those familiar with the robotic art. Tools and/or material are to be fed into the work envelope of the robot. According to prior known techniques, this has been done by supplyng tools and/or material on a conveyor belt which continuously runs through the work envelope of the robot. Such a system requires, for example, exact positioning of the material on the conveyor belt and exact conveyor speed to make it possible for the robot gripper to find the material needed. Further, as such a conveyor belt must have a limited length, material must be continuously loaded onto the conveyor belt. Thus, the supply of tools and/or material demands continuous human interaction.

In the copending U.S. patent application Ser. No. 590,825 filed Mar. 25, 1983 and assigned to the same assignee, IBM an automatic transport system is described. Tools and/or material are fed into the work envelope of the robot on pallets, which are transported by said automatic transport system. Thus, complete sets of tools for different assembly operations may be prepared on separate pallets and then the pallets may be automatically moved in sequence into the work envelope of the robot means of the above mentioned automatic transport system. Similarly, complete sets of material needed for said assembly operations may be prepared on other separate pallets and then fed automatically in sequence into the work envelope of the robot.

To make it possible for the robot gripper to find the tool and material needed the pallets must be exactly positioned within the work envelope of the robot.

U.S. Pat. No. 4,394,897, issued July 26, 1983, shows a machine used in automation equipment wherein pallets are moved to stations located therein, and clamped for a machining operation. The locating and clamping mechanisms consist of an arrangement of pins, levers, linkages and movable clamps.

SUMMARY OF THE INVENTION

This problem is solved by the docking and locking means according to the subject invention. The pallets loaded with tools and/or material are fed by the above mentioned automatic transport system into an approximate work position defined by guide rails and stop means within the work envelope of the robot. Said approximate position is sensed by sensing means and signalled to a control unit. Then, the docking and locking means are activated by a control signal from said control unit. The docking and locking means brings the pallet into an exactly defined work position and locks it in that position while, at the same time, completing electrical and fluidic connections.

It is one object of the present invention to provide a single docking and locking means for locating a pallet in the x, y and z direction in a station, locking it in place and making the electrical connections and fluidic couplings simultaneously.

It is another object of the present invention to provide an upward displacement of the docking and locking means to obtain x and y (horizontal) exact locating of the pallet in the station and simultaneously completing the electrical and fluidic connections during a further serial upward displacement to provide the z (vertical) exact locating of the pallet in the station and simultaneously providing the locking in place.

BRIEF DESCRIPTION OF THE DRAWINGS

The invention, which is defined in the attached claims, is described in detail below with reference to the drawings which illustrate only one specific embodiment in which

DESCRIPTION OF THE PREFERRED EMBODIMENT

Figure 1:
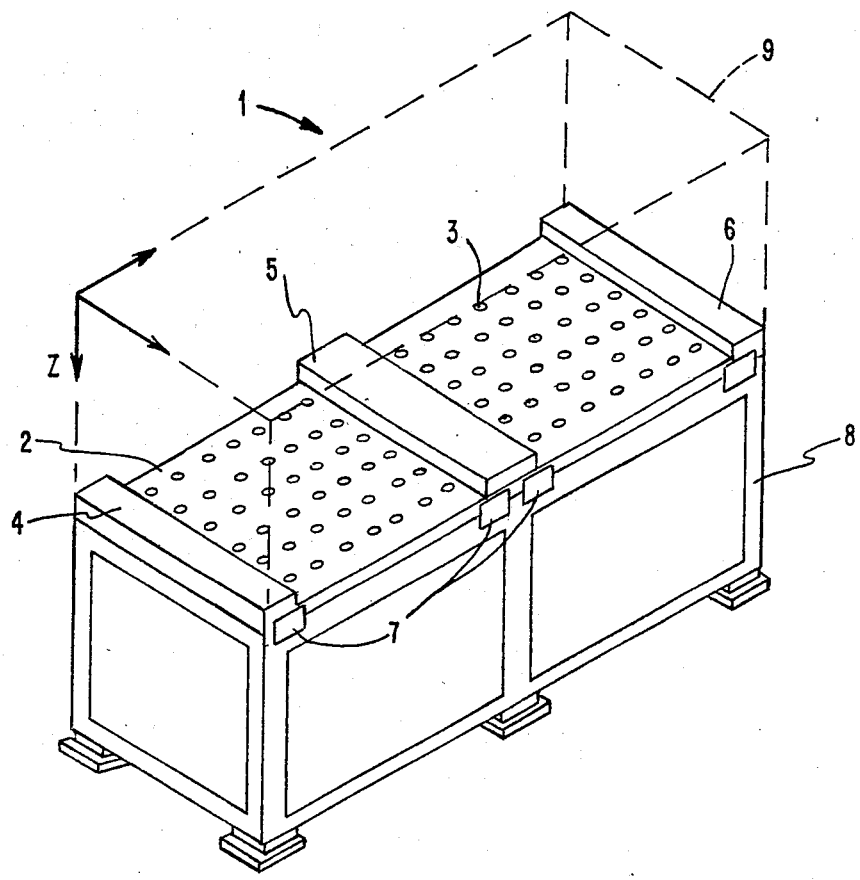
FIG. 1 is a perspective view of a robot system with exchangeable work tables, pallets.

FIG. 1 shows a perspective view of a robot system 1 provided with exchangeable work tables called pallets 2 and 3. The work table area is provided with guide rails 4, 5 and 6 and stop means 7. Thus, the pallet can be moved into an approximate work position defined by said guide rails 4 to 6 and said stop means 7. Then, the pallet is brought into an exactly defined work position and fixed (locked) in that position by the docking and locking means according to the subject invention described below.

Figure 2:
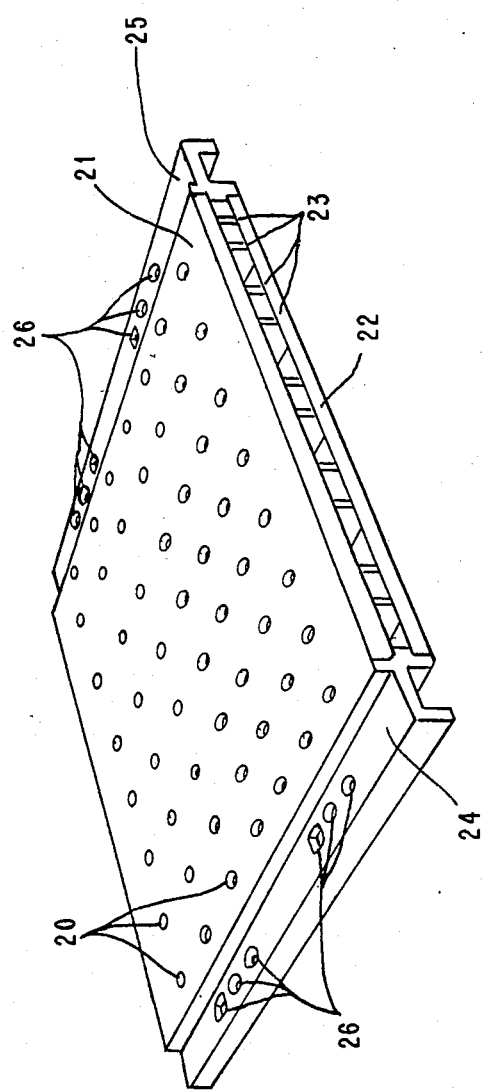
FIG. 2 is a perspective view of a pallet.

FIG. 2 shows a perspective view of a preferred embodiment of a pallet. To meet the requirement of strength in construction and to get a very flat upper surface and, at the same time keeping the weight very low, the pallet is made in sandwhich form.

The pallet contains an upper plate 21, preferably an aluminum or steel plate with a well defined pattern of holes 20 therein, and a lower plate 22 with corresponding holes (not shown). The two plates are joined together in a spaced relationship by means of square pipes 23 glued to respective plate 21 and 22. The pallet is provided with extruded sections 24 and 25 which are partly inserted between the plates 21 and 22 and fastened to them by means of gluing. The extruded sections 24 and 25 extend along opposite edges of the pallet.

The extruded sections are provided with means 26 for cooperation with docking and locking means in accordance with the subject invention.

Figure 3:
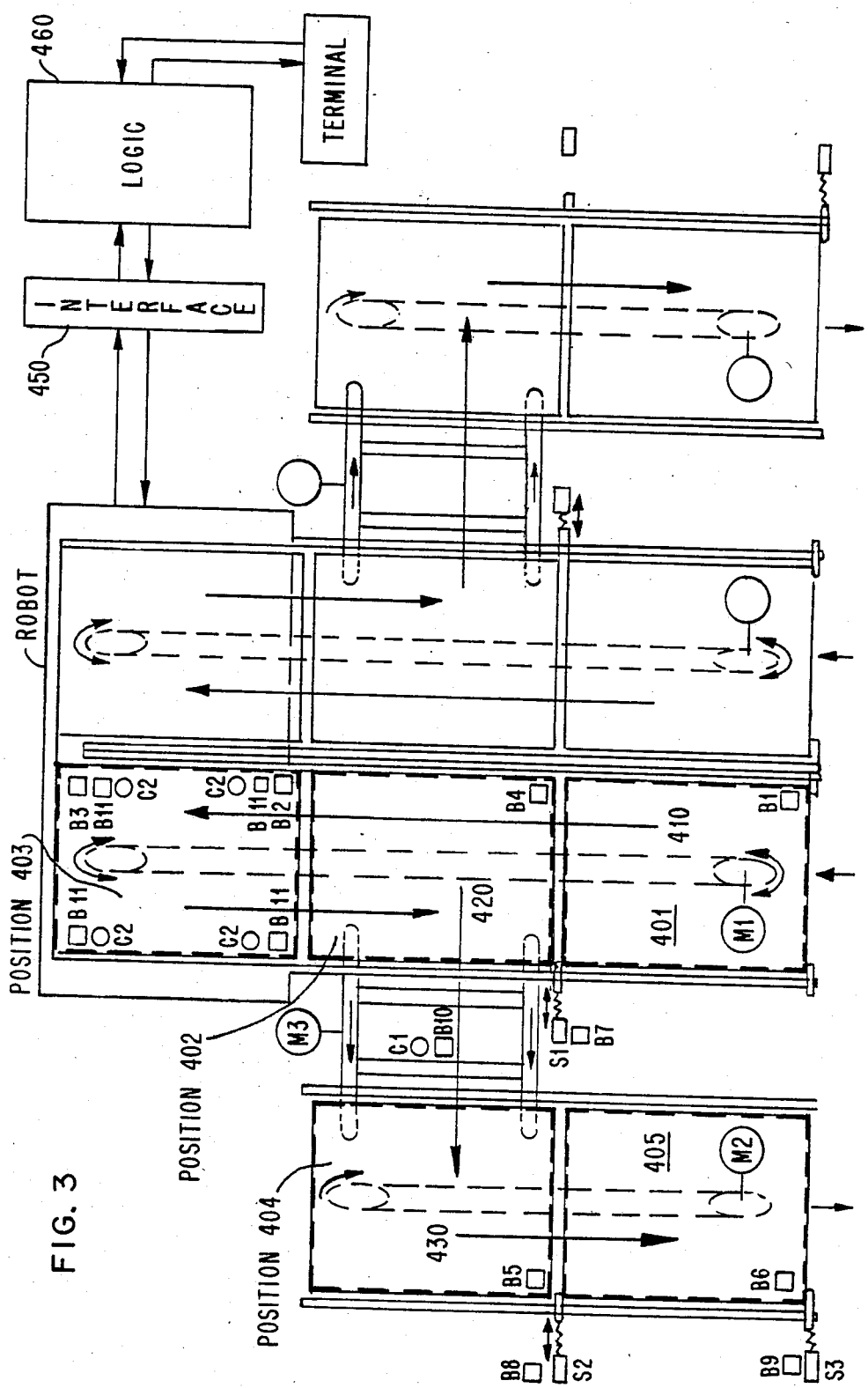
FIG. 3 is a schematic view of a transport system for pallets.

FIG. 3 is a schematic view of a transport system for exchange of pallets in a robot system. The robot is of the type described above in connection with FIG. 1. The transport system is described in detail in the above mentioed copending U.S. patent application Ser. No. 590,825 to which earlier reference is made. The transport system is divided into two parts which are mirror images of each other.

Each part of the conveyor system consists of three transport paths. A first one is indicated by arrow 410 and is used for transport of a pallet from a preload position 401 to a work position 403 intermediate position 402. A second transport path is indicated by arrow 420 and is used for transport of the pallet from said intermediate position 402 in transport path 410 to a first position 404 of a third transport 430. The third transport path 430 is used to transport the pallet from said first position 404 to an output position 405 for the pallet.

The transport paths are provided with sensing means B1, B2, B3, B4, B5 and B6 for sensing and signalling the position of a pallet to an operation-controlling logic device 460. Stop means S1, S2 and S3 with associated sensing means B7, B8 and B9, respectively, are also arranged along the transport paths 410, 420 and 430. Docking means, indicated by C2 and actuable by hydraulic means (not shown) upon a signal from the control unit 460, are arranged to cooperate with a pallet positioned in the work position 403. The position of the docking means C2 is sensed by sensing means B11.

The conveyor system operates automatically under program control. The conveyor system is, via an interface 450, coupled to said operation-controlling logic device 460, which is also used for controlling the operation of the robot.

Figure 4:
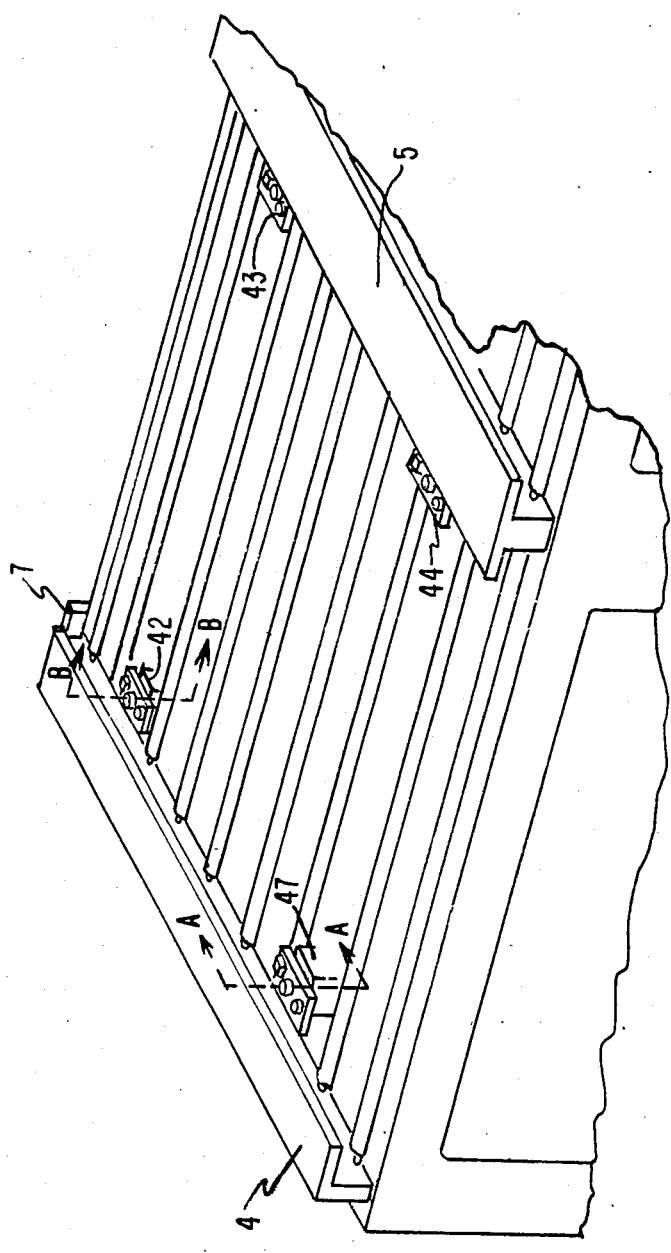
FIG. 4 is a perspective view showing the positions of the docking and locking means.

FIG. 4 is a perspective view showing the positions of docking and locking means 41 to 44 below the work table (pallet) area of the robot. The pallet is transported into an approximate work position defined by the guide rails 4 and 5 and stop means 7 by means of a roller conveyor.

Figure 5:
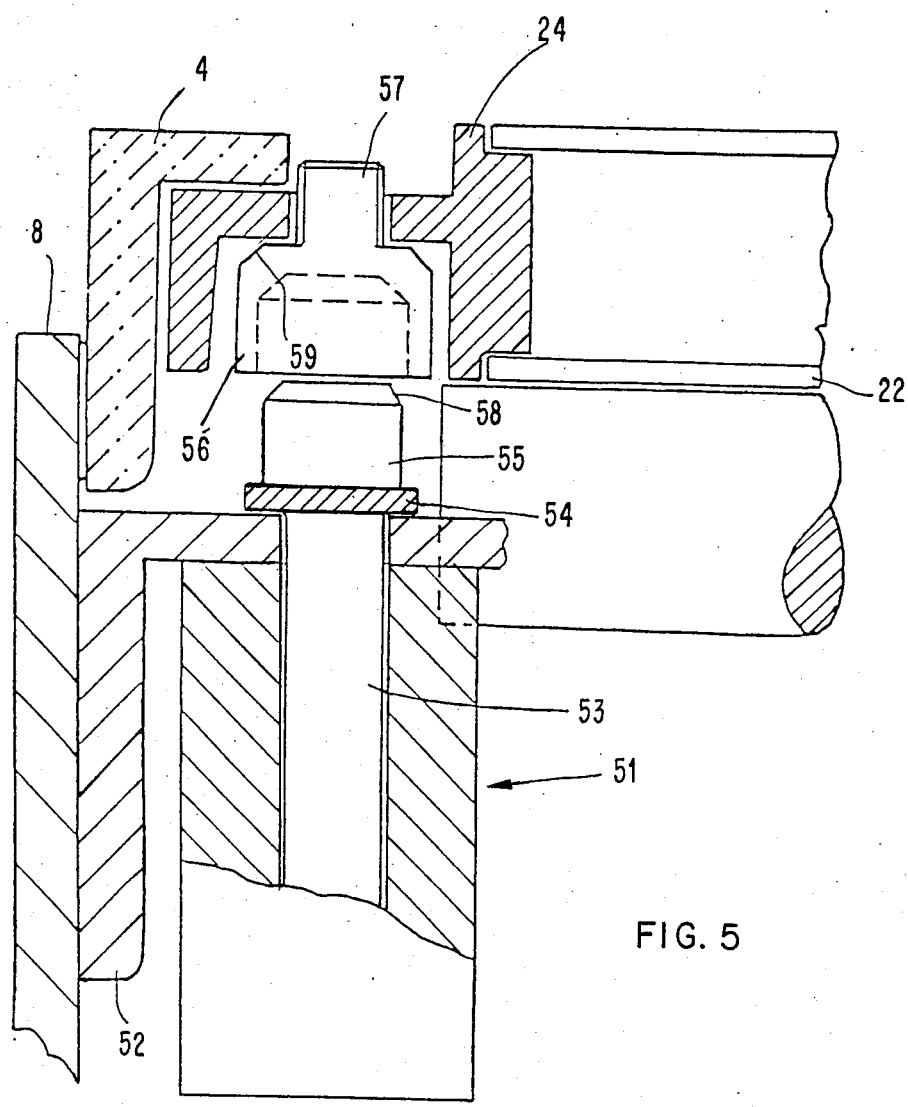
FIG. 5 is a sectional view along line A—A in FIG. 4.

FIG. 5 is a sectional view along line A—A of the docking means of FIG. 4. A linear motor, for example a hydraulic or pneumatic motor 51, is shown fixedly mounted to the robot frame 8 by means of an angle bar 52. The movable part 53 of the motor is provided with an elongated bar 54 and a cylindrical formed stud 55 for cooperation with a socket 56, which is an integral part of a stud bolt 57. The stud bolt 57 is adjustably fastened to the extruded section 24 of a pallet which has been brought into the approximate work position. The stud 55 has an upper chamfered section 58. The inner diameter of the socket 56 is slightly greater than the diameter of the stud 55. The socket 56 is provided with an inner tapered section 59 for cooperation with said chamfered section 58 of the stud 55.

When the linear motor 51 is activated, it moves bar 54 and the stud 55 upwards. During said upward movement the chamfered section 58 of the stud 55 will contact the lower inner edge of the socket 56 and cause a lateral movement of the pallet so that the stud 55 can move into the socket. At the further movement of the linear motor 51 the chamfered section 58 of the stud 55 will contact the tapered section 59 of the socket 56 with the result that the stud and the socket will be exactly laterally positioned with respect to each other. That means the pallet will be exactly positioned in the x and y coordinate directions.

Finally, the further movement of the linear motor 51 will cause the stud 55 to lift the pallet and press its extruded section 24 against the guide rail 4, which is fixedly mounted to the robot frame 8 in an exactly defined z coordinate position, thereby exactly defining the position of the top surface of the pallet in the z coordinate direction and locking the pallet in place.

Figure 6:
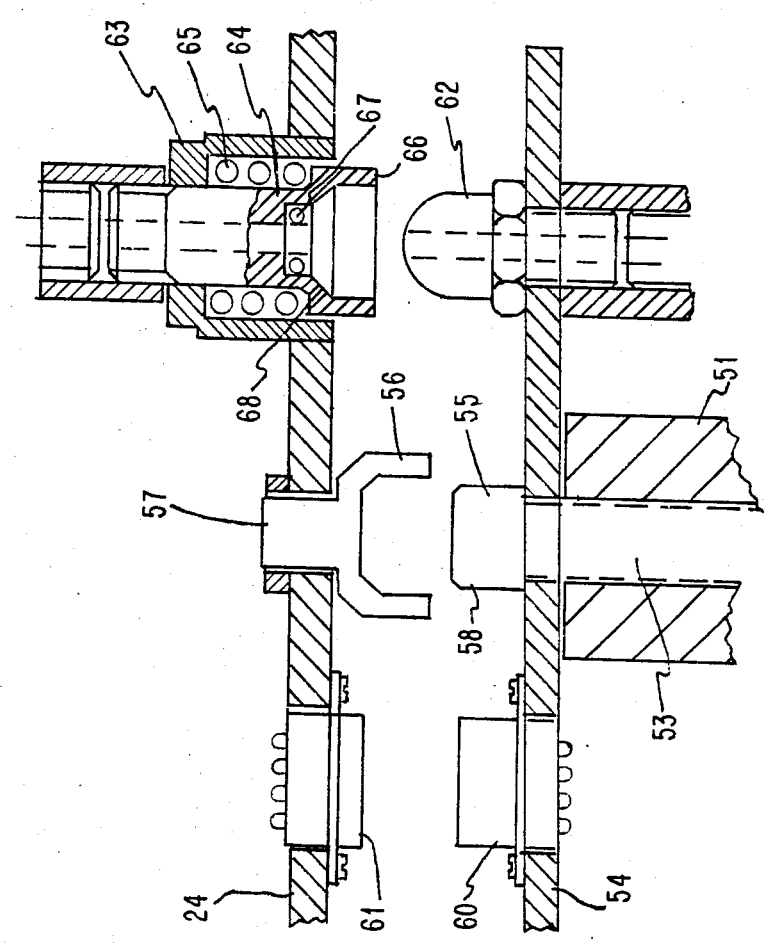
FIG. 6 is a sectional view along line B—B in FIG. 4.

FIG. 6 is a sectional view along line B—B of FIG. 4. FIG. 6 shows a sectional view of the docking and locking means. In the docking means connector elements 60 and 62 are fixedly mounted to the elongated bar 54 which, as mentioned above, is fixedly mounted to the movable part 53 of the linear motor 51. the extruded section 24 of the pallet is provided with corresponding docking means 61 and 64, respectively. The docking means may, for example, include an electric connector 60-61 or a fluidic coupling such as a hydraulic or pneumatic connector or coupling 62-64 for supplying electrical power and/or electrical control signals and oil or air pressure or vacuum, respectively, to the devices on the pallet. When, as described above, the linear motor 51 is activated it moves the elongated bar 54, which is provided with the docking means connector elements 60 and 62, upwards. During said upwards movement the chamfered section 58 of the stud 55 will contact the lower inner edge of the socket 56 and cause a lateral movement of the pallet so that the stud 55 can move into the socket. This also has the effect that the docking means elements, parts 60 and 61 of the electrical connector and the two parts 62 and 64 of the air or oil pressure or vacuum coupling, become aligned with each other. Thus, at the further movement of the bar 54 the two parts 60 and 61 and the two parts 62 and 64 will be coupled together, respectively. The part 64 of the connector 62-63 is resiliently journalled in a housing 63 by means of a coil spring 65. Thus, when the lower part 62 of the connector, which is spherically formed, is moved upwards it passes into the socket 66 and contacts the bushing 67 and the tapered section 68. The further movement of the lower part 62 presses the upper part 64 upwards against the force of the spring 65. Thus, an absolutely tight coupling is obtained.

The unlocking of the pallet for moving out of the station is simply a reversal of the linear motor which unlocks the extruded sections of the pallet by relieving the pressure of the extruded sections against the frame rails and extracting the stud from the stud bolt and the connector parts of the docking means from each other thereby leaving the pallet free for movement.

While a preferred embodiment has been shown and described, it will be understood that there is no intent to limit the invention by such disclosure but, rather, it is intended to cover all modification in alternate construction falling within the spirit and scope of the invention as defined in the attached claims.

What is claimed is:

1. A docking and locking apparatus for a pallet which has been moved into an approximate work position in a robot or like system characterized by:
   a robot frame,
   a guide rail fixedly mounted to said robot frame,
   a linear motor fixedly mounted to said robot frame,
   an elongated bar fastened to the movable part of said linear motor,
   a stud means and docking means fixedly mounted to the top surface of said bar,
   a pallet,
   extruded sections forming opposite sides of said pallet,
   a socket,
   a stud bolt, said socket forming an integral part of said stud bolt which is adjustably mounted to said extruded section of said pallet,
   said socket cooperating with said stud means when said stud means is moved upwards by said linear motor in order to position the pallet in a horizontal, exactly defined position, and upwardly move said pallet against the bottom of said guide rail to position the pallet in an exactly defined vertical position and to lock the pallet in the exactly defined positions, and
   further docking means located on said extruded section of said pallet for mating with said docking means simultaneously with the vertical positioning of said stud means when said elongated bar is moved vertically by said linear motor, said docking means including an electrical connector and a fluid coupling both having first and second parts.

2. The system according to claim 1 characterized in that said stud means has a cylindrical shape and in that said socket has an inner diameter which is slightly greater than the diameter of said stud means.

3. The system according to claim 2 characterized in that said stud means is provided with a chamfered section and said socket is provided with a tapered section, said chamfered section of said stud means cooperating with said tapered section of said socket to laterally position the pallet.

4. The system according to claim 1 characterized in that said stud bolt is laterally and vertically adjustable.

5. The system according to claim 1 characterized in that, said first part of said electrical connector is attached to the top surface of said bar for cooperation with said second part of said electrical connector which is fixedly mounted to the pallet.

6. The system according to claim 1 characterized in that, said first part of said fluid coupling is attached to the top surface of said bar for cooperation with said second part of said fluid coupling, said second part of said fluid coupling being resilienlty mounted to the pallet.

* * * * *